May 15, 1962 H. VANTINE, JR 3,035,262
DIRECTION FINDING AND RANGING SYSTEM FOR FLASH TYPE SIGNALS
Filed Nov. 3, 1960 4 Sheets-Sheet 1

INVENTOR.
HARRY VANTINE, JR.
BY
ATTORNEY

May 15, 1962 H. VANTINE, JR 3,035,262
DIRECTION FINDING AND RANGING SYSTEM FOR FLASH TYPE SIGNALS
Filed Nov. 3, 1960 4 Sheets-Sheet 4
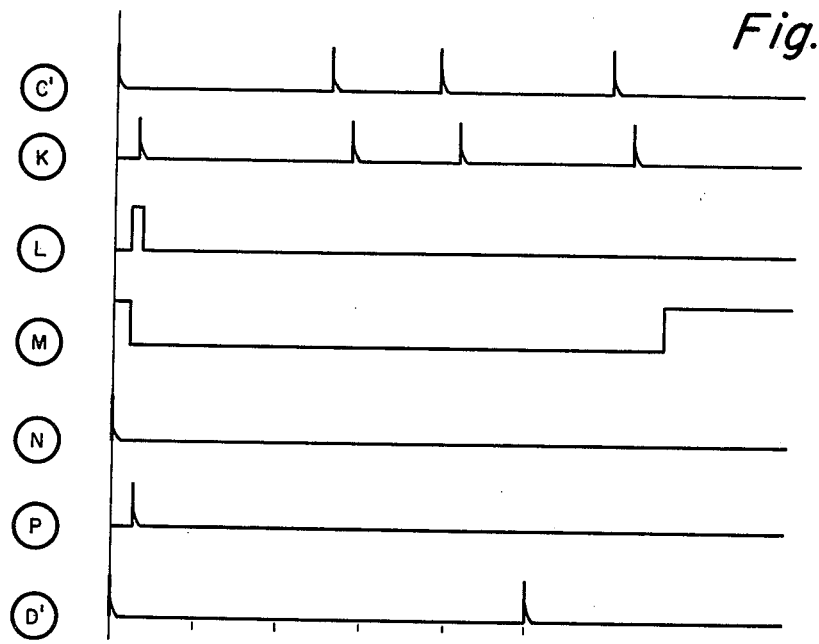
Fig. 6a
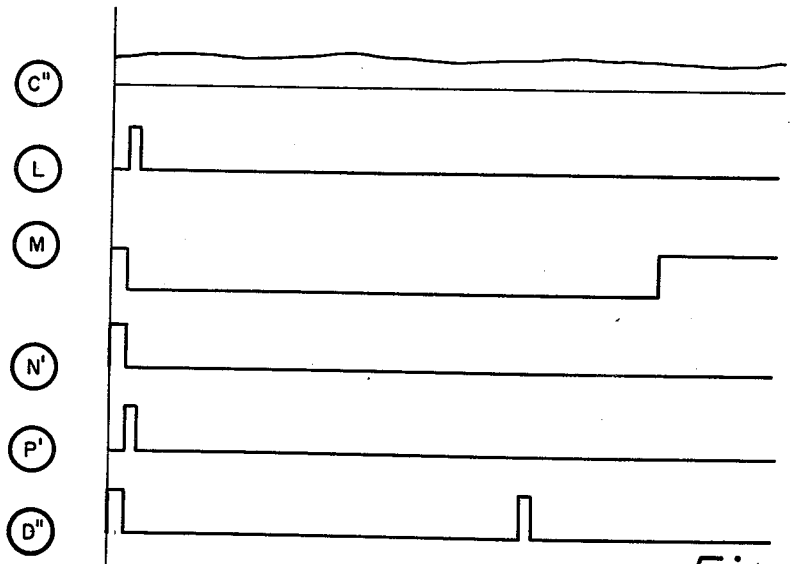
Fig. 6b
INVENTOR.
HARRY VANTINE, JR.
BY
ATTORNEY

United States Patent Office 3,035,262
Patented May 15, 1962

3,035,262
DIRECTION FINDING AND RANGING SYSTEM FOR FLASH TYPE SIGNALS
Harry Vantine, Jr., 1545 Marian Road, Abington, Pa.
Filed Nov. 3, 1960, Ser. No. 67,143
9 Claims. (Cl. 343—6.5)
(Granted under Title 35, U.S. Code (1952), sec. 266)

The invention herein described may be manufactured and used by or for the Government of the United States of America for governmental purposes without the payment of any royalties thereon or therefor.

The present invention relates to a direction finding and ranging system for flash type signals, and more particularly to an interrogator-transponder system operable upon flash type signals to determine the bearing and distance between an aircraft and a base station. The term flash type signal is employed herein to designate a very short duration signal which may comprise a single pulse or a pulse code.

Known direction finding and ranging systems are either incapable of operating upon flash type signals or are characterized by having a variety of disadvantages not present in systems constructed in accordance with the principles of the present invention. For example, systems utilizing a rotating directional antenna require the received signal to persist for at least the length of time it takes for the antenna to make one complete revolution. Systems of this type are not operable upon flash type signals. Another known system utilizes a plurality of nonrotating directional antennas each having a complete receiver associated therewith. Systems of this type require a large number of complete receivers in order to provide acceptable accuracy when operated in a flash type transmission environment. Further, when the directional antennas are constructed to provide overlapping beams, it is necessary that the antenna and receiver gain characteristics be well known. Finally, known direction finding systems of the lobe matching type, while free from some of the disadvantages mentioned above, require rotating elements with apparent attendant disadvantages.

As will be apparent upon consideration of the detailed description below of illustrative embodiments of the present invention, systems constructed in accordance with the principles thereof are free from the disadvantages mentioned above.

At the base station there may be provided a single complete frequency tunable receiver associated with an omnidirectional antenna, a plurality of wide band fixed tuned detectors respectively coupled to a corresponding plurality of directional antennas, a coding network coupling the wide band detectors to a portion of the complete receiver, decoding means coupled to the receiver operable to provide an azimuth indication, and means to transmit an azimuth coded reply signal to an interrogating aircraft.

At the aircraft, in addition to means to generate and transmit interrogating signals and means to receive and display azimuth information from the base station, there may be provided means operable to display range information in accordance with the elapsed time between transmission of an interrogating signal and receipt of a reply signal.

There may further be provided in the airborne and base station equipment, means to provide azimuth and range information only to selected aircraft within a control area. In addition, there may be provided at the base station, means to discriminate between a plurality of interrogating signals of the same frequency and means to determine the direction of arrival of a continuous signal.

It is, therefore, a principal object of the present invention to provide a direction finding and ranging system of simplified and reliable construction capable of operating upon flash type radio signals.

It is another object of the present invention to provide a direction finding and ranging system operable upon flash type radio signals to provide an azimuth indication at a base station as well as to provide range and azimuth information to a selected interrogating aircraft.

It is still another object of the present invention to provide a direction finding and ranging system of the character described in the preceding objects wherein there is provided, in the base station equipment, the additional capability of determining the direction and arrival of a continuous radio signal.

Other objects and many of the attendant advantages of this invention will be readily appreciated as the same becomes better understood by reference to the following detailed description of embodiments thereof when considered in connection with the accompanying drawings wherein.

Figure 2:
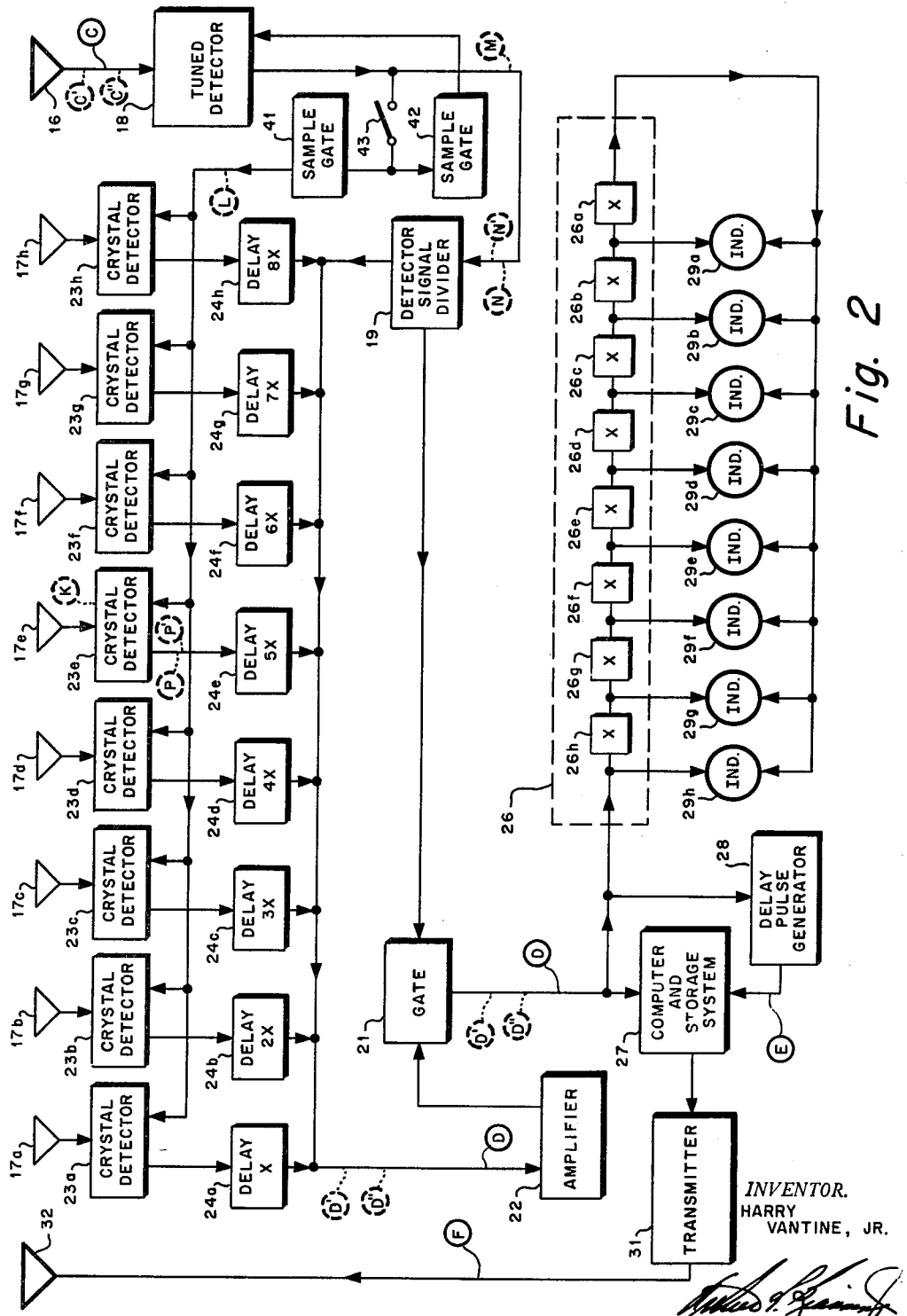
FIG. 2 illustrates in block diagram form the base station portion of an embodiment of the invention.
Figure 5A:
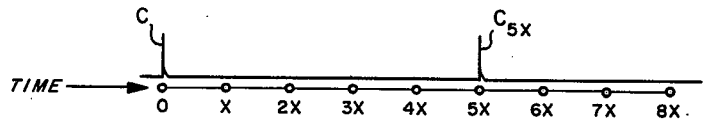
Figure 5B:
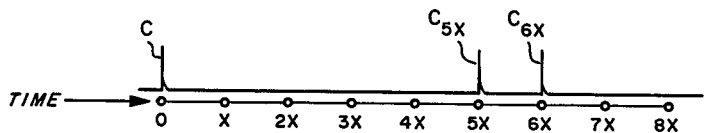
Figure 5C:
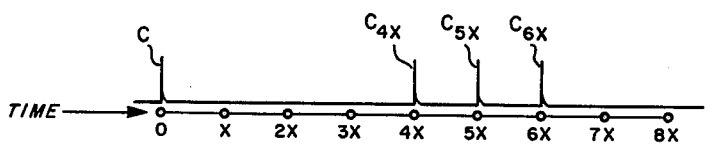

FIGS. 5a, 5b, and 5c illustrate various azimuth codes which may be generated in the portion of an embodiment of the invention illustrated in FIG. 2; and FIGS. 6a and 6b show various waveforms selected to illustrate the manner in which embodiments of the invention function to discriminate between interrogating signals of the same frequency and to determine the direction of arrival of a continuous radio signal, respectively.

Figure 1:
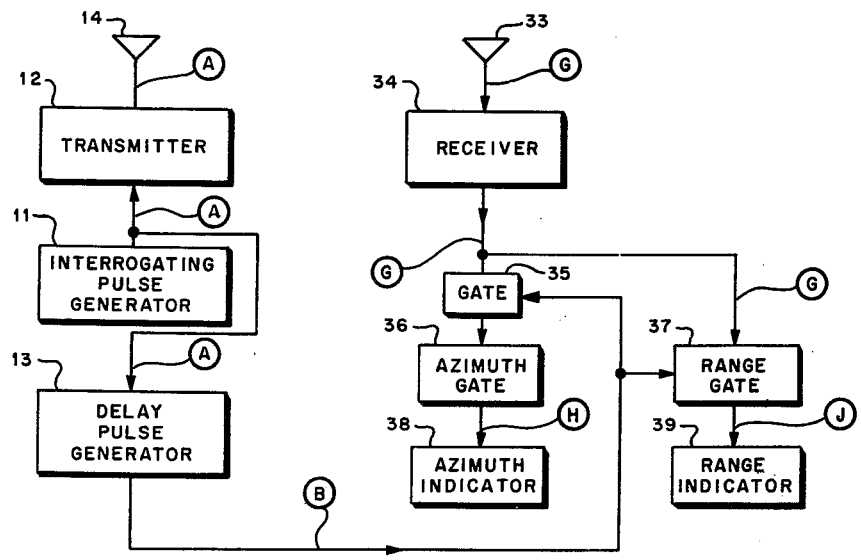
FIG. 1 illustrates in block diagram form the airborne portion of an embodiment of the invention.

Referring now to FIG. 1, operation of the system as an interrogator-transponder system begins with the generation of an interrogating pulse or pulse code in an interrogating pulse generator 11 which forms a part of the airborne portion of an embodiment of the invention. For the sake of simplicity, it will be assumed herein that the pulse code comprises a single pulse as shown by waveform A in FIG. 4.

The output signal from interrogating pulse generator 11 is coupled conjointly to a transmitter 12 and a delay pulse generator 13, in turn coupled conjointly to a gate 35 and a range gate 37. Accordingly, at the same time that an interrogating signal is radiated from an antenna 14, coupled to transmitter 12, a long delay pulse of selectable duration is initiated in delay pulse generator 13 for a purpose to be described below. The delay pulse is illustrated by waveform B in FIG. 4.

After a time interval depending upon the range between the interrogating aircraft and a base station–which may be an aircraft carrier, for example, the interrogating signal is received upon an omnidirectional antenna 16 and one or more directional antennas 17a through 17h (FIG. 2) depending upon the beam width of the directional antennas and the direction of arrival and strength of the interrogating signal.

Figure 4:
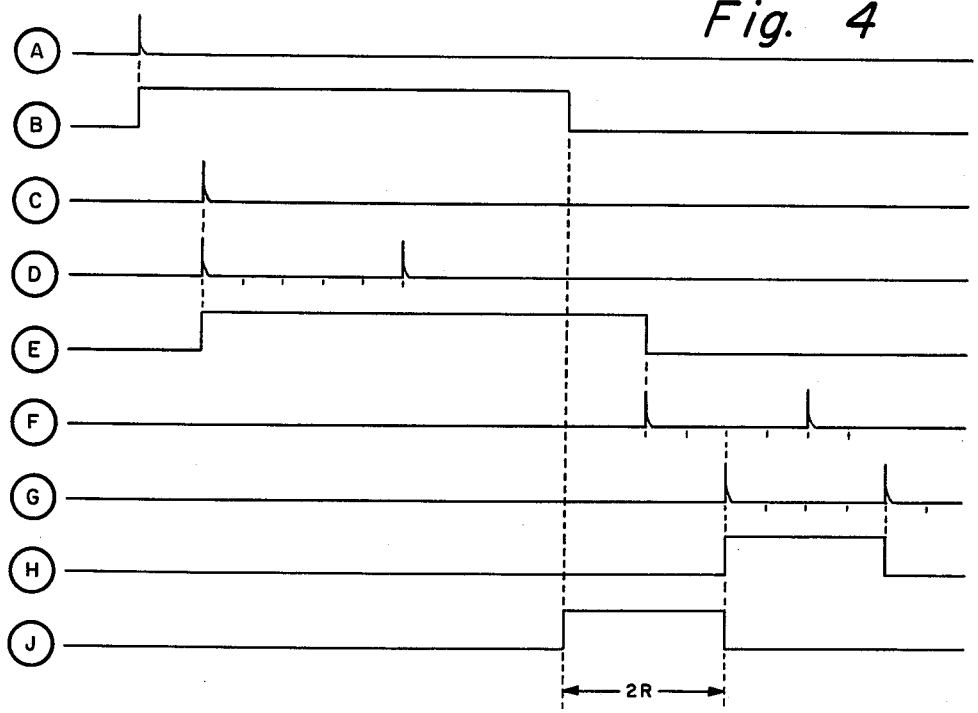
FIG. 4 depicts various waveforms occurring in the embodiment of the invention illustrated in FIGS. 1 and 2.

The received interrogating signal is indicated by waveform C in FIG. 4.

Again for the sake of simplicity, it will be initially assumed that the interrogating signal is received only upon one of directional antennas 17.

Figure 3:
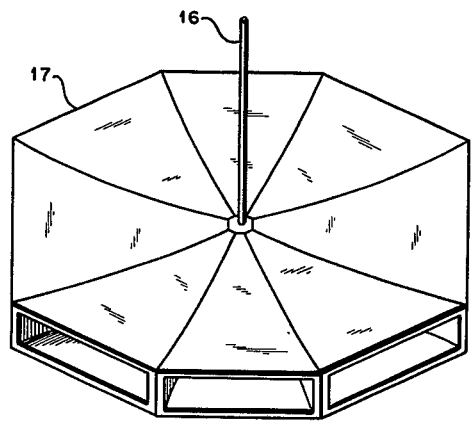
FIG. 3 illustrates schematically an antenna array which may be utilized with the base station portion of embodiments of the invention.

FIG. 3 schematically represents a typical base station antenna array wherein nondirectional antenna 16 may comprise a stub antenna and directional antennas 17 may comprise, for example, eight horn type antennas.

Referring now again to FIG. 2, the interrogating signal received upon the omnidirectional antenna 16 is coupled to the input circuit of a tunable radio frequency detector 18. The ouptut signal from detector 18 is coupled through a signal divider 19 and applied as an enabling pulse to a gate 21 and as one input signal to a receiver amplifier 22. At the same time, the interrogating signal is coupled from a directional antenna 17 through a wide band fixed tuned radio frequency detector system, which may comprise a plurality of crystal detectors 23a through 23h, and through a coding network, which may comprise a plurality of delay circuits 24a through 24h, and applied as another input signal to amplifier 22.

Signal divider 19, which is constructed to pass signals only in the direction indicated to thereby isolate the control circuitry of gate 21 from the coding system, functions to prevent enabling of gate 21 by signals appearing in the output circuit of the coding system. Sufficient system delay may be provided in amplifier 22 to permit operation of gate 21 prior to the time that a signal appears in the output circuit of the amplifier.

Coding delay circuits 24a through 24h are selected to provide successively greater delay periods which for convenience may comprise integral multiples of a delay period X which has a duration in excess of the interrogating pulse or pulse code duration or, as will be explained below, the duration of a selected sample of a received continuous radio signal.

Gate 21, which may comprise a monostable multivibrator circuit, after receipt of an enabling pulse remains in an open condition for a time period selected to be slightly in excess of the maximum delay which may be provided by the coding system.

The coded azimuth signal, which may comprise a pair of spaced pulses as indicated by waveform D in FIG. 4, is coupled from gate 21 conjointly to the input circuit of a decoding network 26, a computer and storage system 27, and a delay pulse generator 28, similar to delay pulse generator 13 (FIG. 1).

Decoder 26 may comprise a tapped delay line. The segments of the delay line are equal in number to delay lines 24 and each provide a delay period X. Coding network 24 may likewise comprise a tapped delay line having equal segments each providing a delay period X with detector 23h and amplifier 22 respectively coupled in the input and output circuits thereof.

A plurality of indicators of the coincidence type 29a through 29h are respectively coupled to delay line segments 26a through 26h. Coincidence indicators 29 may be of the type illustrated in FIG. 4 of co-pending application Serial No. 66,365 of Harry Vantine, Jr. for Proximity Warning or Position Separation Device filed October 31, 1960.

In order to facilitate the description of the mode of operation of the coincidence indicators, it is assumed that an interrogating signal of proper frequency has been received upon omnidirectional antenna 16 and upon directional antenna 17e. Accordingly, as indicated in FIG. 5a, a pair of pulses spaced 5X time units apart are applied to the input of decoder 26. Upon the expiration of 8X time units, the first of the pulses appears in the output circuit of decoder 26 and is coupled conjointly as one input signal to each of coincidence indicators 29a through 29h. At this time, the second pulse, trailing the first by 5X time units, is applied as another input signal only to coincidence indicator 29e. Accordingly, coincidence occurs in this indicator circuit and the indicator portion thereof is activated.

It is to be understood that the indicator portions of coincidence indicator circuits 29a through 29h may be arranged in a geometric pattern upon a suitable mounting means (not shown), for example, in a compass rose pattern. Accordingly, there is presented at the base station a graphic indication of the bearing between the base station and the interrogating aircraft.

Assuming for the moment that the interrogating signal has been received upon more than one directional antenna, the bearing between the base station and the interrogating aircraft may be obtained by visual interpretation of the indicator display. If, for example, as indicated in FIG. 5b, the interrogating signal is received upon directional antennas 17e and 17f, coincidence will occur in both coincidence indicator circuits 29e and 29f. The actual bearing between the base station and the interrogating aircraft may then be assumed to lie between the directions indicated by either of the indicator portions of coincidence indicator circuits 29e or 29f. By the way of further example, when the interrogating signal is received upon each of directional antennas 17d, 17e, and 17f, as indicated by FIG. 5c, coincidence will occur in coincidence indicator circuits 29d, 29e and 29f. The actual bearing between the base station and the interrogating aircraft then lies in a direction which would be indicated by activation of coincidence indicator circuit 29e alone.

As mentioned above, the pulse pair output signal from gate 21 is coupled to computer and storage system 27 and delay pulse generator 28 at the same time that the signal is coupled to the input circuit of decoder 26. Application of the first of the pulse pair to delay pulse generator 28 initiates a long delay pulse coupled to computer and storage system 27 that has a duration corresponding to that generated by delay pulse generator 13 (FIG. 1). The long delay pulse functions as a readout signal whereby, upon the termination of the delay pulse, the azimuth code stored in computer and storage system 27 is applied to a transmitter 31.

Computer and storage system 27 may function simply to store the pulse pairs received from gate 21 or, if desired, may further function to generate a different but corresponding azimuth pulse code. For example, the interpulse period between the pulse pairs may be shortened or lengthened, should this be desired.

Application of a signal to transmitter 31 from computer and storage system 27 functions to key transmitter 31 whereupon an azimuth coded reply signal is coupled from transmitter 31 to antenna 32 for transmission to the interrogating aircraft. Antenna 32 may be omnidirectional or, since the azimuth of the interrogating aircraft is now known, antenna 32 may comprise a directional array or a single translatable directional antenna to permit the reply signal to be beamed in the direction of the interrogating aircraft.

Referring now again to FIG. 1, the azimuth coded reply signal, waveform G, FIG. 4, is received upon an omnidirectional antenna 33 and coupled to the input circuit of a receiver 34. The output signal from receiver 34 is coupled through a gate 35 to the input circuit of an azimuth gate 36 having an azimuth indicator 38 coupled in the output circuit thereof and to the input circuit of a range gate 37 having a range indicator coupled in the output circuit thereof.

Gate 35 may comprise a monostable multivibrator, while azimuth gate 36 and range gate 37 may each comprise a bistable multivibrator. Azimuth indicator 38 and range indicator 39 may each comprise any known circuit or system, appropriately calibrated, operable to measure the duration of a pulse. The indicators may be provided, respectively, with directional and distance scales.

As mentioned above, the output circuit of delay pulse generator 13 is coupled conjointly to gate 35 and to range gate 37. Upon termination of the long delay pulse from delay pulse generator 13, gate 35 is enabled and remains open for a time period sufficient to permit complete reception of an azimuth coded reply signal and at the same time a range measuring pulse, waveform J, FIG. 4, is initiated. The first pulse of the reply pulse code, waveform G, FIG. 4, initiates an azimuth measuring pulse, waveform H, FIG. 4, and terminates the range measuring pulse. Thereafter the second pulse in the reply pulse code terminates the azimuth measuring pulse.

In the above description it has been assumed that the interrogating signal is received upon only one of directional antennas 17, FIG. 2. Computer and storage system 27 may be provided with an azimuth weighing system to permit generation of a non-ambiguous azimuth coded reply signal when the interrogating signal is received upon more than one of directional antennas 17. Alternatively, the azimuth code coupled to computer and storage system 27 from gate 21 may be simply stored for the delay period determined by delay pulse generator 28 and then transmitted without modification to the interrogating aircraft. With this arrangement, azimuth gate 36 and indicator 38 may be replaced with a system similar to decoder 26 and coincidence indicator circuits 29 to permit visual interpretation.

By presetting the delay pulse generators 13, 28, computer and storage system 27, and azimuth indicator 38, range and azimuth information may be provided only to selected aircraft within the control area.

In the above discussion, it has been assumed that the portion of the embodiment of the invention illustrated in FIG. 2 operates in response to receipt of a single interrogating pulse or pulse code. As will be explained more fully below, operation upon multiple interrogating pulses of the same frequency and partial operation upon a continuous signal is also possible.

In addition to the circuitry described above, there is shown in FIG. 2 a pair of sample gates 41, 42 having the input circuits thereof coupled conjointly through a switching means 43 to the output circuit of tuned detector 18. The purpose and mode of operation of sample gates 41, 42 may be best understood by reference to the waveforms of FIGS. 6a and 6b.

Referring now to FIG. 2 and to FIG. 6a, where a plurality of aircraft are transmitting interrogating pulses or pulse codes on the same frequency, the signals received on omnidirectional antenna 16 and directional antennas 17 may have the appearance of waveform C' in FIG. 6a. Upon receipt of a signal from tuned detector 18, sample gates 41, 42, after a short time delay, respectively function to provide an enabling gate to crystal detectors 23 and a disabling gate to tuned detector 18. The enabling gate, shown by waveform L in FIG. 6a, is selected to have a duration slightly in excess of the duration of the interrogating pulse or pulse code, while the disabling gate, shown by waveform M in FIG. 6a, is selected to have a duration slightly in excess of 8X time units. In order to limit the duration of sample gate 41, to provide better discrimination between closely spaced interrogating pulses or pulse codes received from different aircraft, as shown by waveform K in FIG. 6a, a small fixed delay may be provided in each of crystal detectors 23, whereby the output signals therefrom coincide in time with enabling gate L. As indicated by waveforms N and P in FIG. 6a, operation of sample gates 41, 42 function to provide a single selected interrogating signal in the output circuits of tuned detector 18 and crystal detectors 23. The remainder of the circuitry illustrated in FIG. 2 functions as above described providing an azimuth coded input signal to amplifier 22, as indicated by waveform D' in FIG. 6a.

Referring now to FIG. 2 and FIG. 6b, the system of the present invention, while primarily intended to be operable upon flash type or short duration signals, is capable of functioning to provide an indication in the base station equipment of the direction of arrival of a continuous radio signal of the general character illustrated by waveform C" in FIG. 6b. In this mode of operation, the gating signals from sample gates 41, 42 function to extract a small sample of the received continuous signal to thereby provide short duration pulses in the output circuits of tuned detector 18 and crystal detectors 23 as indicated by waveforms N" and P" in FIG. 6b. As may be best understood by comparison of waveforms L, M, N" and P" in FIG. 6b, the pulse output signal from tuned detector 18 and crystal detectors 23 respectively have durations corresponding to the time duration which elapses between reception of the continuous signal and operation of the sample gates and to the duration of the enabling gate from sample gate 41. The resultant azimuth pulse code, which may have the appearance indicated by waveform D" in FIG. 6b, is coupled through amplifier 22 and gate 21 to the input circuit of decoder 26 which functions as above described to indicate the direction of arrival of the continuous signal. While range measurements are not possible when the above described embodiments of the invention are operated upon a continuous signal, an azimuth coded reply signal may be transmitted to the signalling aircraft in the manner above described, should this be desirable.

While specific embodiments of this invention have been described above, it is apparent that many modifications and variations of the invention are possible in light of the above teachings. It is therefore to be understood that within the scope of the appended claims, the invention may be practiced otherwise than as specifically described.

What is claimed is:

1. In a direction finding and ranging system, apparatus comprising: means operable to generate and transmit an interrogating signal, means operable to receive an azimuth coded reply signal, range indicating means coupled to said interrogating signal generating and transmitting means and to said receiving means operable to measure the time duration between transmission of an interrogating signal and receipt of a reply signal, and azimuth indicating means coupled to said receiving means operable to present an azimuth indication in accordance with said received azimuth coded reply signal, said range indicating means comprising, a delay pulse generating means coupled to said interrogating signal generating and transmitting means operable to generate a delay pulse of selectable duration initiated upon transmission of said interrogating signal, and range gate means coupled to said delay pulse generating means and to said receiving means operable to generate a pulse initiating upon termination of said delay pulse and terminating upon receipt of said reply signal.

2. The combination of claim 1 wherein said azimuth indicating means comprises: an azimuth gate coupled to said receiving means operable to generate a pulse initiating upon receipt of a reply signal and terminating upon termination of said reply signal.

3. In a direction finding and ranging system, apparatus comprising: a tunable radio frequency detector having the input circuit thereof coupled to an omnidirectional receiving antenna, a plurality of fixed tuned wide band radio frequency detectors having the input circuits thereof respectively coupled to a corresponding plurality of directional receiving antennas, a coding network comprising a plurality of delay circuits equal in number to said fixed tuned detectors, one of said delay circuits providing a delay period having a duration X, the remainder of said delay circuits respectively providing delay periods which are successively greater integral multiples of said delay period X, receiver amplifier means having the input circuit thereof coupled to the output circuit of said tuned detector and further coupled, respectively, through said delay circuits to the output circuits of said plurality of fixed tuned detectors, a decoder gate having the control circuit thereof coupled to the output circuit of said tuned detector, a decoder comprising a tapped delay line, the segments of which are equal in number to said plurality of delay circuits, said segments each providing a delay period X, circuit means including said decoder gate coupling the output circuit of said receiver amplifier to the input circuit of said decoder, a plurality of indicating circuits of the coincidence type each having one input circuit thereof coupled in common to the output circuit of said decoder and each having the other input circuit thereof respectively coupled to a segment of said delay line, transmitting means, and circuit means including said decoder gate coupling the input circuit of said transmitting means to the output circuit of said receiver amplifier means.

4. The combination of claim 3 wherein said circuit means coupling said transmitting means to said receiver amplifier means includes storage means provided with a readout signal input circuit and having the input circuit thereof coupled through said decoder gate to the output circuit of said receiver amplifier means and having the output circuit thereof coupled to the input circuit of said transmitting means, delay pulse generating means having the input circuit thereof coupled to said decoder gate and the output circuit thereof coupled to said readout signal input circuit, said delay pulse generator being operable to generate a pulse of selectable duration initiating upon receipt of a signal from said decoder gate and further being operable to provide a readout signal to said storage means upon termination of said delay pulse.

5. The combination of claim 4 wherein there is further provided first and second sample gate means having the input circuits thereof coupled in common to the output circuit of said tuned detector and having the output circuits thereof respectively coupled to control the operation of said tuned detector and said fixed tuned detectors.

6. A direction finding and ranging system comprising: an interrogator-indicator comprising means operable to generate and transmit an interrogating signal, means operable to receive an azimuth coded reply signal, range indicating means coupled to said interrogating signal generating and transmitting means and to said receiving means operable to measure the time duration between transmission of an interrogating signal and receipt of a reply signal, and azimuth indicating means coupled to said receiving means operable to present an azimuth indication in accordance with said received azimuth coded reply signal; and a transponder-indicator comprising a tunable radio frequency detector having the input circuit thereof coupled to an omnidirectional receiving antenna, a plurality of fixed tuned wide band radio frequency detectors having the input circuits thereof respectively coupled to a corresponding plurality of directional receiving antennas, a coding network comprising a plurality of delay circuits equal in number to said fixed tuned detectors, one of said delay circuits providing a delay period having a duration X, the remainder of said delay circuits respectively providing delay periods which are successively greater integral multiples of said delay period X, receiver amplifier means having the input circuit thereof coupled to the output circuit of said tuned detector and further coupled, respectively, through said delay circuits to the output circuits of said plurality of fixed tuned detectors, a decoder gate having the control circuit thereof coupled to the output circuit of said tuned detector, a decoder comprising a tapped delay line, the segments of which are equal in number to said plurality of delay circuits, said segments each providing a delay period X, circuit means including said decoder gate coupling the output circuit of said receiver amplifier to the input circuit of said decoder, a plurality of indicating circuits of the coincidence type each having one input circuit thereof coupled in common to the output circuit of said decoder and each having the other input circuit thereof respectively coupled to a segment of said delay line, transmitting means, and circuit means including said decoder gate coupling the input circuit of said transmitting means to the output circuit of said receiver amplifier means.

7. A direction finding and ranging system comprising: an interrogator-indicator comprising means operable to generate and transmit an interrogating signal, means operable to receive an azimuth coded reply signal, delay pulse generating means coupled to said interrogating signal generating and transmitting means operable to generate a delay pulse of selectable duration initiated upon transmission of said interrogating signal, range gate means coupled to said delay pulse generating means and to said receiving means operable to generate a pulse initiating upon termination of said delay pulse and terminating upon receipt of said reply signal, and azimuth indicating means coupled to said receiving means operable to present an azimuth indication in accordance with said received azimuth coded reply signal; and a transponder-indicator comprising a tunable radio frequency detector having the input circuit thereof coupled to an omnidirectional receiving antenna, a plurality of fixed tuned wide band radio frequency detectors having the input circuits thereof respectively coupled to a corresponding plurality of directional receiving antennas, a coding network comprising a plurality of delay circuits equal in number to said fixed tuned detectors, one of said delay circuits providing a delay period having a duration X, the remainder of said delay circuits respectively providing delay periods which are successively greater integral multiples of said delay period X, receiver amplifier means having the input circuit thereof coupled to the output circuit of said tuned detector and further coupled, respectively, through said delay circuits to the output circuits of said plurality of fixed tuned detectors, a decoder gate having the control circuit thereof coupled to the output circuit of said tuned detector, a decoder comprising a tapped delay line, the segments of which are equal in number to said plurality of delay circuits, said segments each providing a delay period X, circuit means including said decoder gate coupling the output circuit of said receiver amplifier to the input circuit of said decoder, a plurality of indicating circuits of the coincidence type each having one input circuit thereof coupled in common to the output circuit of said decoder and each having the other input circuit thereof respectively coupled to a segment of said delay line, transmitting means, and circuit means including storage means provided with a readout signal input circuit and having the input circuit thereof coupled through said decoder gate to the output circuit of said receiver amplifier means and having the output circuit thereof coupled to the input circuit of said transmitting means, delay pulse generating means having the input circuits thereof coupled to said decoder gate and the output circuits thereof coupled to said readout signal input circuit, said delay pulse generator being operable to generate a pulse of selectable duration initiating upon receipt of a signal from said decoder gate and further being operable to provide a readout signal to said storage means upon termination of said delay pulse.

8. The combination of claim 7 wherein there is further provided first and second sample gate means in said transponder-indicator having the input circuits thereof coupled in common to the output circuit of said tuned detector and having the output circuits thereof respectively coupled to control the operation of said tuned detector and said fixed tuned detectors.

9. The combination of claim 8 wherein the azimuth indicating means of said interrogator-indicator comprises: an azimuth gate coupled to said receiving means operable to generate a pulse initiating upon receipt of a reply signal and terminating upon termination of said reply signal.

References Cited in the file of this patent
UNITED STATES PATENTS
2,792,570    Stewart _____ May 14, 1957